(12) United States Patent
Miyamoto

(10) Patent No.: US 7,746,564 B2
(45) Date of Patent: Jun. 29, 2010

(54) LENS BARREL

(75) Inventor: Hidenori Miyamoto, Urayasu (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/230,169

(22) Filed: Aug. 25, 2008

(65) Prior Publication Data

US 2008/0316624 A1 Dec. 25, 2008

Related U.S. Application Data

(63) Continuation of application No. 11/371,005, filed on Mar. 9, 2006, now abandoned.

(30) Foreign Application Priority Data

Mar. 15, 2005 (JP) ............................. 2005-072320

(51) Int. Cl.
G02B 15/14 (2006.01)
G02B 7/02 (2006.01)
G02B 7/04 (2006.01)
(52) U.S. Cl. ....................... 359/696; 359/694; 359/823; 359/826; 396/144; 396/72; 396/90; 348/208.2
(58) Field of Classification Search ................. 359/819, 359/823–826, 830, 612, 694–702; 396/55, 396/72, 90, 144, 448; 324/207.2, 207.21, 324/207.24; 348/208.2, 208.8, E5.025, E5.026, 348/E5.028; 310/328
See application file for complete search history.

(56) References Cited

U.S. PATENT DOCUMENTS

| 3,610,733 | A | 10/1971 | Back | 359/683 |
| 5,166,829 | A | 11/1992 | Iizuka | 359/699 |
| 5,272,567 | A | 12/1993 | Inoue | 359/696 |
| 5,937,215 | A | 8/1999 | Mogamiya | 396/85 |
| 6,434,331 | B1 | 8/2002 | Araoka et al. | 396/72 |

(Continued)

FOREIGN PATENT DOCUMENTS

JP 06-201980 7/1994

(Continued)

OTHER PUBLICATIONS

Office Action issued Oct. 31, 2008 in corresponding Chinese Patent Application No. 200610059140.1.

(Continued)

Primary Examiner—Loha Ben

(57) ABSTRACT

A lens barrel includes a first optical element that is allowed to move along an optical axis, a first driven member connected to the first optical element, a second optical element disposed in the optical axis of the first optical element, which is allowed to move along the optical axis, a second driven member connected to the second optical element, a first drive shaft disposed substantially parallel to the optical axis to drive the first driven member along the optical axis, a second drive shaft disposed substantially parallel to the optical axis to drive the second driven member along the optical axis, a first drive unit connected to an end of the first drive shaft to drive the first drive shaft, and a second drive unit connected to an end of the second drive shaft to drive the second drive shaft and disposed at a position that partially overlaps a position of the first drive unit when viewed from the direction of the optical axis.

13 Claims, 11 Drawing Sheets

U.S. PATENT DOCUMENTS

| | | | |
|---|---|---|---|
| 6,654,557 B2 | 11/2003 | Kikuchi et al. | 396/144 |
| 7,173,772 B2 | 2/2007 | Masuda | 359/696 |
| 7,236,316 B2 | 6/2007 | Miki | 359/819 |
| 7,321,470 B2 | 1/2008 | Matsumoto et al. | 359/694 |
| 7,446,962 B2 * | 11/2008 | Matsumoto et al. | 359/819 |
| 7,635,228 B2 | 12/2009 | Ishimoda et al. | 396/351 |

FOREIGN PATENT DOCUMENTS

| | | |
|---|---|---|
| JP | 2002-131611 | 5/2002 |
| JP | 2003-241056 | 8/2003 |
| JP | 2004-133052 | 4/2004 |
| JP | 2006-133366 | 5/2006 |

OTHER PUBLICATIONS

USPTO Office Action issued on Feb. 25, 2008 in related U.S. Appl. No. 11/371,005.

* cited by examiner

FIG.6A
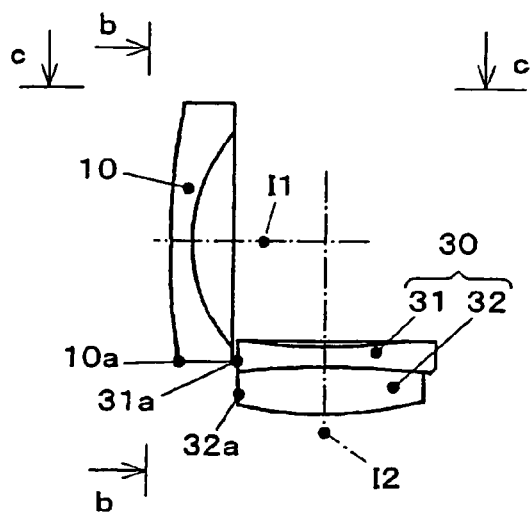
FIG.6 B
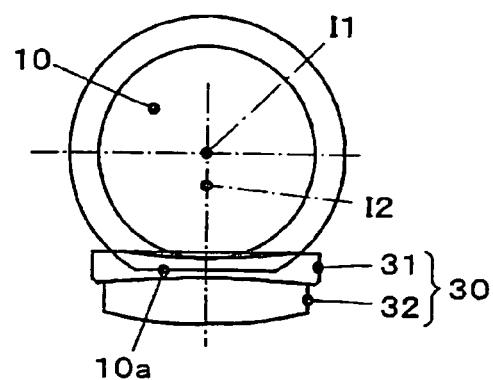
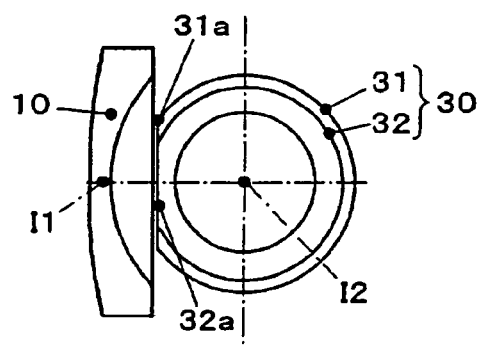
FIG.6C

LENS BARREL

CROSS-REFERENCE TO RELATED APPLICATIONS

This application is a continuation of U.S. application Ser. No. 11/371,005, filed Mar. 9, 2006, and now abandoned, which further claims the benefit of priority of Japanese Patent Application No. 2005-072320 filed Mar. 15, 2005, the contents of which are incorporated herein by reference.

BACKGROUND OF THE INVENTION

1. Field of the Invention

The present invention relates to a lens barrel that includes a plurality of optical elements driven independently of one another along the direction of the optical axis thereof.

2. Description of the Related Art

The lens barrel of a camera that houses the photographic optical system of the camera, known in the related art may include a plurality of movable lens units that move independently of one another along the direction of the optical axis thereof.

At a lens barrel that includes an optical system adopting such a multiple unit structure, lead screws extending parallel to the optical axis and transmission mechanisms that are connected to the movable lens units and each include a threaded portion to engage with the lead screw are disposed so as to drive the movable lens units along the optical axis by rotationally driving the lead screws. One lead screw is disposed in conjunction with each movable lens unit.

Japanese Laid Open Patent Publication No. 2003-241056 discloses a lens barrel that includes two movable lens units. In this lens barrel, two lead screws are disposed adjacent to the optical system, with motors for rotationally driving the individual lead screws disposed side-by-side at the ends of the lead screws on one side.

In the structure described above in which the plurality of lead screws each disposed parallel to the optical axis are driven by motors disposed side-by-side, the distance between the axes of the lead screws is likely to be significant due to the restrictions imposed by the motor size, which makes it difficult to provide a lens barrel as a compact unit, specifically with regard to its measurement along the direction perpendicular to the optical axis of the lens barrel (the direction along which the lead screws are disposed).

SUMMARY OF THE INVENTION

A lens barrel according to a first aspect of the present invention includes a first optical element that is allowed to move along an optical axis, a first driven member connected to the first optical element, a second optical element disposed in the optical axis of the first optical element, which is allowed to move along the optical axis, a second driven member connected to the second optical element, a first drive shaft disposed substantially parallel to the optical axis to drive the first driven member along the optical axis, a second drive shaft disposed substantially parallel to the optical axis to drive the second driven member along the optical axis, a first drive unit connected to an end of the first drive shaft to drive the first drive shaft, and a second drive unit connected to an end of the second drive shaft to drive the second drive shaft and disposed at a position that partially overlaps a position of the first drive unit when viewed from the direction of the optical axis.

The lens barrel according to the first aspect may further include a barrel body in which the first optical element and the second optical element are housed, and a support member detachably mounted at the barrel body, which supports the first drive shaft, the second drive shaft, the first drive unit and the second drive unit. It is preferable that the first drive unit is connected to an end of the first drive shaft toward a subject side along the optical axis, and the second drive unit is connected to an end of the second drive shaft toward an image side along the optical axis.

The lens barrel according to the first aspect may further include a light quantity adjustment unit disposed toward the image side along the optical axis relative to the first optical element and the second optical element, and a light quantity adjustment drive unit disposed on a side opposite from the second drive unit with the optical axis present in between, to drive the light quantity adjustment unit.

The lens barrel according to the first aspect may further include a guide unit that guides movement of the first optical element and the second optical element along the optical axis and is disposed on a side where the first drive shaft and the second drive shaft are disposed relative to the optical axis. It is preferable that a first range over which the guide unit guides the first optical element and a second range over which the guide unit guides the second optical element partially overlap along the optical axis.

A lens barrel according to a second aspect of the present invention includes a first optical element that is allowed to move along an optical axis, a first driven member connected to the first optical element, a second optical element disposed in the optical axis of the first optical element, which is allowed to move along the optical axis, a second driven member connected to the second optical element, a first drive shaft disposed substantially parallel to the optical axis to drive the first driven member along the optical axis, a second drive shaft disposed substantially parallel to the optical axis to drive the second driven member along the optical axis, a first drive unit connected to an end of the first drive shaft to drive the first drive shaft, a second drive unit connected to an end of the second drive shaft to drive the second drive shaft, a barrel body in which the first optical element and the second optical element are housed, and a support member detachably mounted at the barrel body, which supports the first drive shaft, the second drive shaft, the first drive unit and the second drive unit.

An imaging apparatus according to a third aspect of the present invention includes a first optical element that is allowed to move along an optical axis, a first driven member connected to the first optical element, a second optical element disposed in the optical axis of the first optical element, which is allowed to move along the optical axis, a second driven member connected to the second optical element, a first drive shaft disposed substantially parallel to the optical axis to drive the first driven member along the optical axis, a second drive shaft disposed substantially parallel to the optical axis to drive the second driven member along the optical axis, a first drive unit connected to an end of the first drive shaft to drive the first drive shaft, a second drive unit connected to an end of the second drive shaft to drive the second drive shaft and disposed at a position that partially overlaps a position of the first drive unit when viewed from the direction of the optical axis, and an image-capturing element that captures a subject image via the first optical element and the second optical element.

In the third aspect, it is preferable that the first drive unit is connected to an end of the first drive shaft toward a subject to be imaged along the optical axis, and the second drive unit is connected to an end of the second drive shaft toward the image-capturing element along the optical axis. The imaging apparatus according to the third aspect may further include an objective lens disposed at a position closest to the subject along the optical axis, and a deflecting member disposed between the objective lens and the first optical element to deflect light from the subject. The deflecting member may be a prism.

BRIEF DESCRIPTION OF THE DRAWINGS

FIGS. 6A~6C show the structures adopted at the objective lens and a first lens unit in the lens barrel shown in FIG. 1.

DETAILED DESCRIPTION OF THE PREFERRED EMBODIMENTS

In a lens barrel achieved in an embodiment of the present invention, which includes a plurality of movable optical element units driven independently of one another, lead screws that drive two lens units are disposed adjacent to each other and motors which drive the individual lead screws are disposed on opposite sides, one on the side of the corresponding lead screw toward an objective lens along an optical axis and the other on the side of the corresponding lead screw toward the image along the optical axis. This configuration reduces the external dimensions of the lens barrel.

Figure 1:
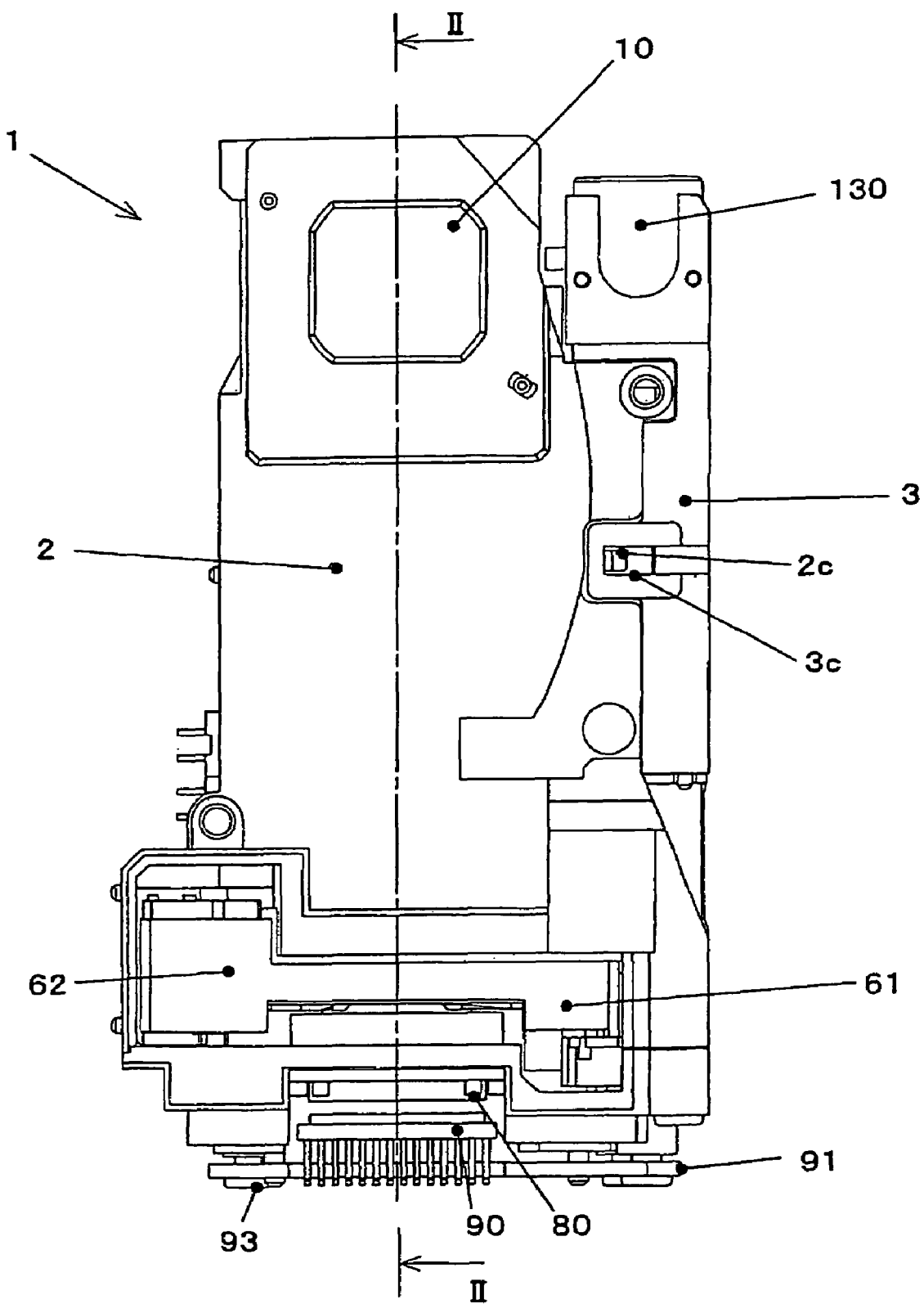
FIG. 1 is an external view of a lens barrel achieved in an embodiment of the present invention, taken from the side of a subject to be photographed.
Figure 2:
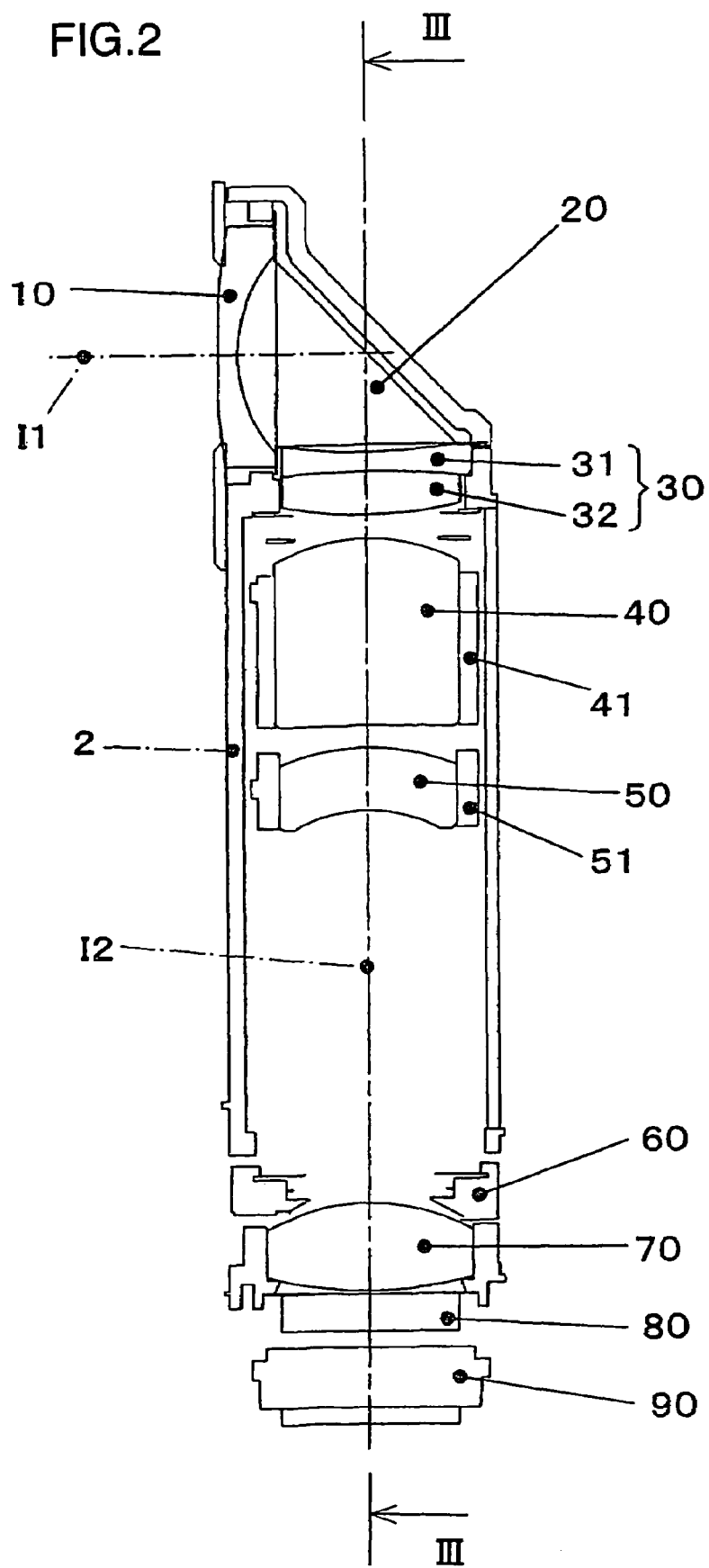
FIG. 2 is a sectional view taken along line II-II in FIG. 1.
Figure 3:
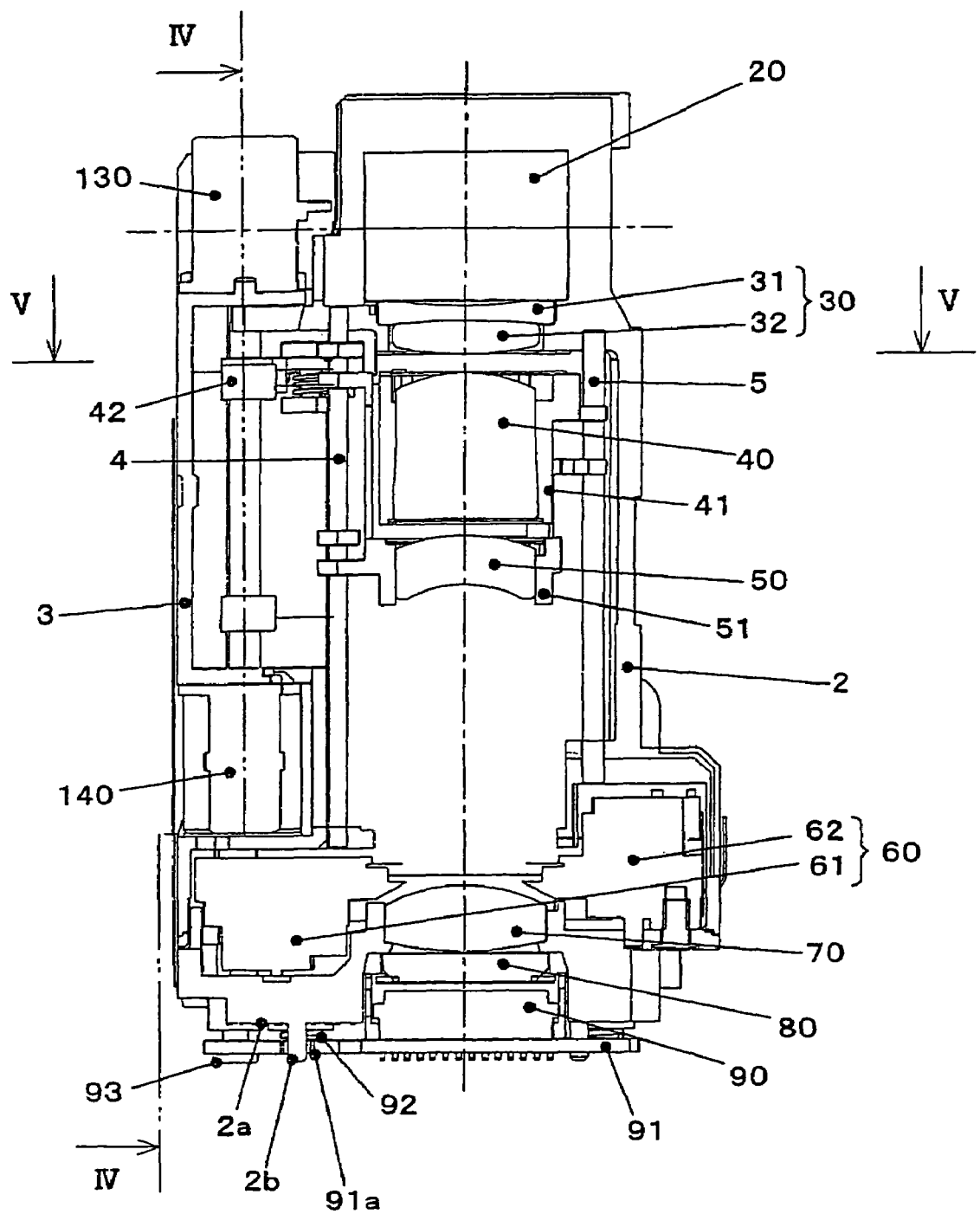
FIG. 3 is a sectional view taken along line III-III in FIG. 2.
Figure 4:
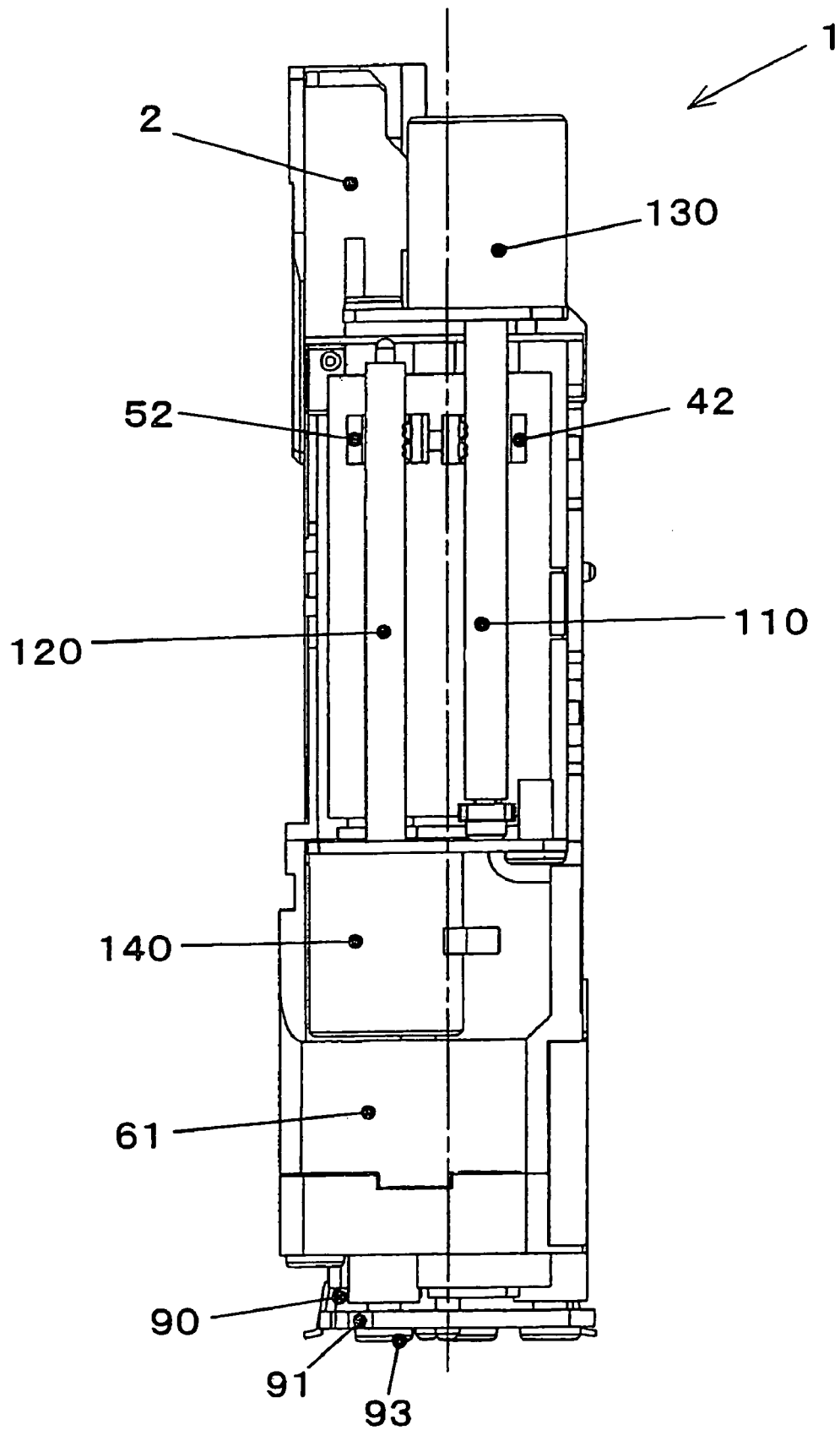
FIG. 4 is a sectional view taken along line IV-IV in FIG. 3.
Figure 5:
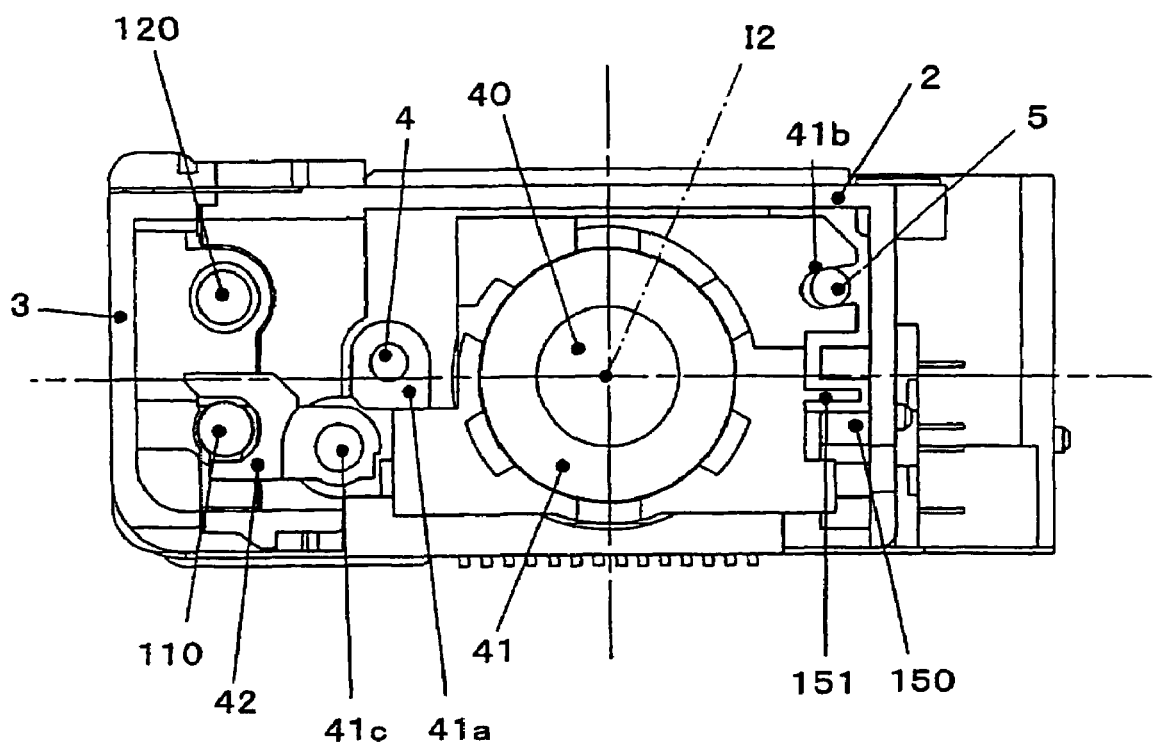
FIG. 5 is a sectional view taken along line V-V in FIG. 3.

The following is a detailed explanation of the embodiment of the present invention, given in reference to drawings. FIG. 1 is an external view of the lens barrel achieved in the embodiment of the present invention, taken from the side of a subject to be photographed, FIG. 2 is a sectional view taken along line II-II in FIG. 1, FIG. 3 is a sectional view taken along line III-III in FIG. 2, FIG. 4 is a sectional view taken along line IV-IV in FIG. 3 and FIG. 5 is a sectional view taken along line V-V in FIG. 3.

A lens barrel 1 achieved in the embodiment includes an optical path bending optical system which alters the direction of the optical axis and may be used as, for instance, a photographic lens barrel in a digital still camera. The lens barrel 1 includes a barrel body 2, a motor holder unit 3, a guide shaft 4 and a rotation-preventing shaft 5 (see FIG. 3 for details of the guide shaft 4 and the rotation-preventing shaft 5).

The barrel body (lens barrel main body) 2, formed so as to assume a substantially rectangular parallelepiped box shape houses therein the bending optical system to be detailed later. The motor holder unit 3 is detachably mounted at a side of the barrel body 2 to support lead screws 110 and 120 and motors 130 and 140 to be detailed later. The motor holder unit 3 is formed in a box shape, and includes an opening at which it is joined to the barrel body 2. In addition, an opening is formed at the barrel body 2 at a position toward the motor holder unit 3, and thus, as the barrel body 2 and the motor holder unit 3 are joined by setting their openings to face opposite each other, a continuous space is formed inside.

It is to be noted that the barrel body 2 and the motor holder unit 3 are each formed through injection molding of a resin material.

The guide shaft 4, disposed inside the barrel body 2, is a member formed as a round rod extending parallel to an optical axis I2 (see FIG. 2). The guide shaft 4 guides a second lens unit 40 and a third lens unit 50 to be detailed later along the direction of the optical axis. The rotation-preventing shaft 5 is disposed inside the barrel body 2 over an area on the side opposite from the guide shaft 4 with the second lens unit 40 and the third lens unit 50 present between them. The rotation-preventing shaft 5, a member formed as a round rod extending parallel to the optical axis I2, prevents rotation of the second lens unit 40 and the third lens unit 50 around the guide shaft 4.

Inside the barrel body 2, an optical system that includes an objective lens 10, a prism 20, a first lens unit 30, the second lens unit 40, the third lens unit 50, a shutter unit 60, a fourth lens unit 70, a low pass filter (LPS) 80 and an image-capturing element 90, is housed. The objective lens 10 as referred to in this context is the lens that is disposed closest to the subject among the components of the optical system housed inside the barrel body 2. The first lens unit 30, the second lens unit 40, the third lens unit 50 and the fourth lens unit 70 each include one or more lenses. The image-capturing element 90, which may be a CCD or a CMOS, captures a subject image having passed through the objective lens 10, the prism 20, the first lens unit 30 and the like. The image-capturing element 90 in the embodiment is constituted with a CCD.

The objective lens 10 is fixed on the surface of the barrel body 2 located toward the subject, adjacent to an opening formed near the top end of the lens barrel 1 mounted in a camera being held sideways, i.e., during a regular photographing operation. The prism 20 is fixed at the barrel body 2 over an area on the exit side of the objective lens 10 and is used as a bending optical unit that changes the direction of the image light having exited the objective lens 10 by, for instance, 90°.

The first lens unit 30 is fixed at the barrel body 2 over an area on the exit side of the prism 20 (the side set facing downward during the regular photographing operation). In addition, the optical axis I2 of the optical system extending from the first lens unit 30 through the components disposed at subsequent stages is set perpendicular to an optical axis I1 of the objective lens 10. During the regular photographing operation, the optical axis I2 is set along a substantially vertical direction.

The first lens unit 30 is constituted by pasting together lenses 31 and 32 sequentially disposed along the optical axis I2 starting on the light entry side with the lens 31 having a greater external diameter than the external diameter of the lens 32. The first lens unit 30 is positioned by locking the portion of the external circumferential edge of the lens 31 projecting beyond the lens 32 at a recessed portion formed at the barrel body 2.

FIGS. 6A through 6C show the structures adopted in the objective lens 10 and the first lens unit 30. In FIG. 6A, the first lens unit 30 is viewed from a direction running perpendicular to the optical axes I1 and I2, whereas FIGS. 6B and 6C respectively present views taken along line b-b and c-c in FIG.

6A. The objective lens 10 adopts a D-cut shape achieved by cutting off the portion of its external circumferential edge, which would be set adjacent to the first lens unit 30. An end surface 10a along which the portion is taken off is a flat surface to face down during a regular photographing operation. The lenses 31 and 32 in the first lens unit 30, too, each adopt a D-cut shape achieved by cutting off part of the external circumferential edge of the respective lens, which would be set adjacent to the objective lens 10. End surfaces 31a and 32a of the lenses 31 and 32 where those parts are cut off are flat surfaces facing toward the object or photographic subject along the optical axis I1, i.e., facing toward the objective lens 10. The first lens unit 30 is disposed by setting the end surface 31a of the lens 31 so as to face opposite the rear surface (located on the opposite side from the subject) of the objective lens 10 over a very small distance.

The second lens unit 40, which is disposed inside the space in the barrel body 2 on the exit side of the first lens unit 30, is a movable optical element supported at the barrel body 2 so as to be allowed to move along the optical axis I2. A lens holder 41, which is a frame disposed around the second lens unit 40, is provided in conjunction with the second lens unit 40, and as the movable lens holder 41 slides along the longitudinal direction of the guide shaft 4 and the rotation-preventing shaft 5, it moves along the optical axis I2. As shown in FIG. 3, the guide shaft 4 and the rotation-preventing shaft 5, disposed over areas on the two opposing sides with the optical axis I2 of the lens holder 41 present between them, each extend parallel to the optical axis I2.

As shown in FIG. 5, the lens holder 41 includes an opening 41a and a groove portion 41b. The diameter of the opening 41a at which the guide shaft 4 is inserted is set larger than the diameter of the guide groove 4 by an extent which will create the necessary clearance.

The groove portion 41b, at which the rotation-preventing shaft 5 is inserted, is formed by recessing or notching the outer edge of the lens holder 41. The groove width at the groove portion 41b is set greater than the diameter of the rotation-preventing shaft 5 by an extent which will create the necessary clearance. It is to be noted that the rotation-preventing shaft 5 does not restrain the lens holder 41 along the direction in which the groove portion 41b extends, i.e., along a substantially horizontal direction in FIG. 5, so as to absorb any dimensional inconsistency that may manifest between the opening 41a and the groove portion 41b.

In addition, the lens holder 41 includes a lens holder nut 42. The lens holder nut 42 is a driven member having a female threaded portion to engage with the lead screw 110 to be detailed later formed an inner surface at one side of a groove at which the lead screw 110 is inserted. The lens holder nut 42 is formed in a two-pronged shape with the two prongs enclosing the groove portion. The lens holder nut 42 is supported so as to be allowed to rotate around a shaft portion 41c disposed at the external circumferential edge of the lens holder 41 to range parallel to the optical axis I2, and a force is applied to the lens holder nut 42 by a spring 42a (see FIGS. 8A and 8B) along a given rotating direction so as to press the female threaded portion against the surface of the lead screw.

The third lens unit 50 is disposed on the exit side of the second lens unit 40 and is housed inside the space in the barrel body 2 where the second lens unit 40 is also housed. The third lens unit 50 is a movable optical element supported at the barrel body 2 so as to be allowed to move along the optical axis I2.

A lens holder 51, which is a frame disposed around the third lens unit 50, is provided in conjunction with the third lens unit 50. As is the movable lens holder 41 described earlier, the movable lens holder 51 is supported by the guide shaft 4 and the rotation-preventing shaft 5 so as to be allowed to move along the optical axis I2. In addition, the lens holder 51 includes a lens holder nut 52 adopting a structure similar to the lens holder nut 42 at the lens holder 41, which engages with the lead screw 120 to be detailed later. A force is applied to the lens holder nut 52 by a spring 52a (see FIGS. 8A and 8B).

It is to be noted that the range of movement of the second lens unit 40 and the range of movement of the third lens unit 50 are set so that they partially overlap.

The shutter unit 60 includes a shutter portion which includes a shutter curtain for blocking the image light having exited the third lens unit 50 to enter the fourth lens unit 70 and an aperture portion (light quantity adjustment portion) which is disposed on the subject side of the shutter portion and includes an ND filter for reducing the quantity of image light. At the aperture portion, a specific ND filter is driven into/out of the optical path in response to an insert instruction signal or a retreat signal output by a control unit (not shown).

The shutter unit 60 further includes a shutter drive portion 61 and an ND filter drive portion 62 that respectively drive the shutter portion and the ND filter. The shutter drive portion 61 and the ND filter drive portion 62 are disposed on the two sides of the optical path. The shutter drive portion 61 is disposed next to the image side of the motor 140 along the optical axis I2, whereas the position of the ND filter drive portion 62 is offset toward the subject side relative to the shutter drive portion 61 along the optical axis I2.

The fourth lens unit 70 is fixed at the barrel body 2 over an area on the exit side of the shutter unit 60.

The LPF 80 is an optical low pass filter fixed at the barrel body 2 over an area on the exit side of the fourth lens unit 70.

Figure 11:
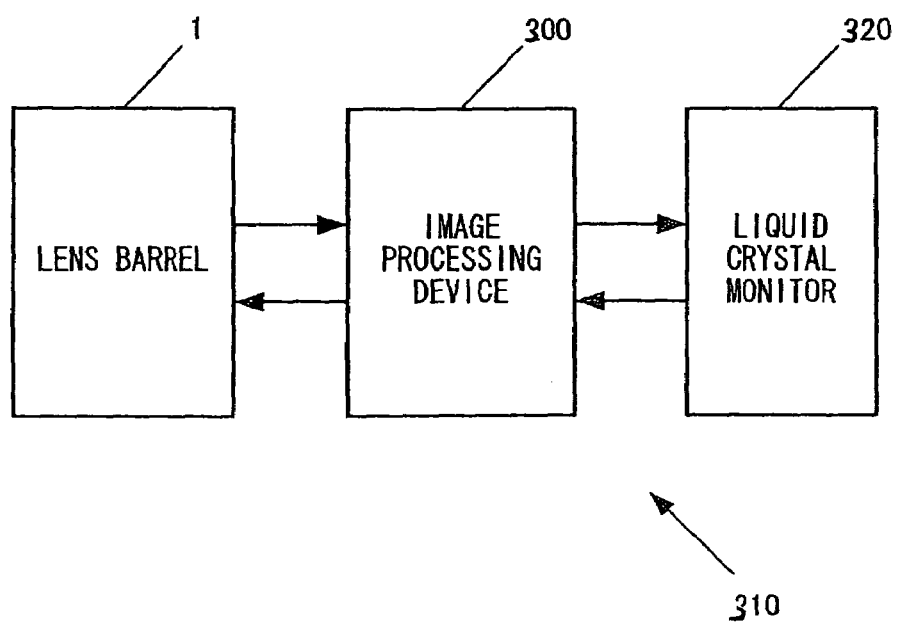
FIG. 11 schematically shows the structure adopted in an image-capturing device that includes the lens barrel achieved in the embodiment.

The CCD 90 is an image-capturing element at which an image is formed with the image light having exited the LPF 80 and the image is captured as an electrical signal. The electrical signal output from the CCD 90 is first input to an image processing device 200, as shown in FIG. 11, and is then saved as an image file. An imaging apparatus 210 is constituted with the lens barrel 1 and the image processing device 200. The imaging apparatus 210 may further include a liquid crystal monitor 220 and, in such a case, an image having been saved can be displayed at the liquid crystal monitor 220 or the like at the imaging apparatus 210.

Figure 7:
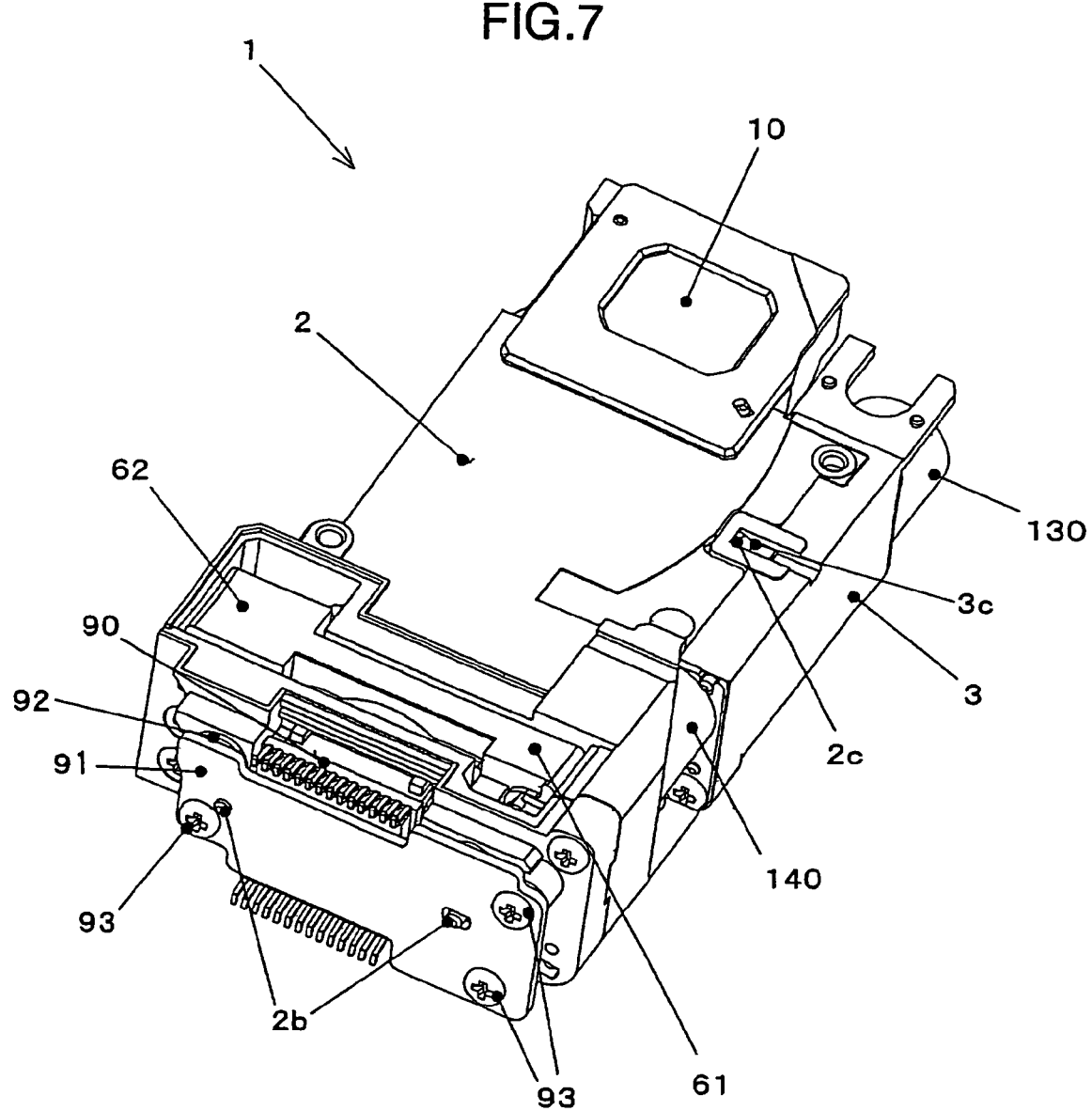
FIG. 7 presents an external perspective of the lens barrel in FIG. 1, taken from the side on which a CCD is disposed.

FIG. 7 is an external perspective of the lens barrel 1 taken from the side where the CCD 90 is disposed.

The CCD 90 is supported on a circuit board 91 fixed onto its rear surface. As shown in FIG. 3, the circuit board 91 is mounted via an elastic member (spring) 92 present between the circuit board 9 and an end surface 2a of the barrel body 2 facing opposite the circuit board 91.

A pin 2b is formed so as to project out of the end surface 2a and, as the pin 2b is inserted at an opening 91a formed at the circuit board 91, the circuit board 91 is positioned along a direction perpendicular to the optical axis I2.

The circuit board 91 is locked by screwing, for instance, three screws 93 disposed over intervals at its peripheral edge into the end surface 2a of the barrel body 2 and then tightening the screws. While the elastic member 92 mentioned earlier is pressed and becomes elastically deformed as the screws 93 are screwed in, the extent to which the elastic member 92 becomes deformed depends upon the extent to which the screws 93 are tightened. Accordingly, by tightening or loosening some of the three screws 93, the circuit board 91 can be tilted along any direction relative to the optical axis I2. An angle adjustment is achieved by tilting the circuit board 91 as described above so as to adjust the image-capturing surface of the CCD 90 in correspondence to the inclination of the image plane attributable to the optical system.

As shown in FIG. 4, the motor holder unit 3 includes the lead screws 110 and 120 and the motors 130 and 140.

The lead screws 110 and 120 are both disposed so as to extend parallel to the optical axis I2 and each constitute a drive shaft with a threaded portion formed at the external circumferential surface thereof. The lead screws 110 and 120, set side-by-side along the optical axis I1, are disposed so that the lead screw 120 is positioned further toward the subject side than the lead screw 110 along the optical axis I1.

The lead screws 110 and 120 are each supported at the motor holder unit 3 so as to be allowed to rotate around the respective central axis. The lead screw 110 engages with the lens holder nut 42 connected to the lens holder 41 at the first lens unit 40 and drives the first lens unit 40 along the optical axis I2. The lead screw 120 engages with the lens holder nut 52 connected to the lens holder 51 at the second lens unit 50 and drives the second lens unit 50 along the optical axis I2.

The motor 130 rotationally drives the lead screw 110 and is connected to an end of the lead screw 110 toward the subject side along the optical axis I2 (toward the upper side in FIG. 4). The motor 130 includes a housing formed in a cylindrical shape substantially coaxial with the lead screw 110, and is fixed by fastening a flange portion 131, which projects out toward the external circumference from the end surface of the housing located on the side toward the lead screw 110, onto the motor holder unit 3 with a screw 132 (see FIG. 10 for details of the flange portion 131 and the screw 132).

The motor 140, which rotationally drives the lead screw 120, is connected to an end of the lead screw 120 toward the image side along the optical axis I2 (toward the bottom side in FIG. 4). The motor 140 is positioned over an area that partially overlaps the area where the motor 130 is mounted, when viewed from the direction of the optical axis I2. The motor 140 includes a housing formed in a cylindrical shape substantially coaxial with the lead screw 120, and is fixed by fastening a flange portion 141, which projects out toward the external circumference from the end surface of the housing located on the side toward the lead screw 120, onto the motor holder unit 3 with a screw 142 (see FIG. 10 for details of the flange portion 141 and the screw 142).

While the motors 130 and 140 are disposed so that one of them is positioned on the subject side and the other is positioned on the image side in the example presented in FIG. 4, the two motors 130 and 140 may instead be disposed on the same side. It is to be noted that the subject side indicates a direction toward a subject to be imaged or photographed by a camera at which the lens barrel 1 is mounted and the image side indicates a direction toward an image of the subject generated or captured by the image-capturing element 90. In the latter case, the lead screw 110 and the lead screw 120 should have lengths different from each other, and the motors 130 and 140 should be disposed at positions different from one another along the longitudinal direction of the lead screws 110 and 120 so that the motors 130 and 140 overlap when viewed from the direction of the optical axis I2, instead of setting the motors 130 and 140 side-by-side along the lateral direction (along the optical axis I1).

It is to be noted that end portions 110a and 120a of the lead screws 110 and 120 on the side opposite from the side where the lead screws are connected with the motors 130 and 140 are respectively inserted at recessed portions 3a and 3b formed at the motor holder unit 3. The recessed portions 3a and 3b may be formed by using a material with a smaller coefficient of friction than that of the material used to constitute the motor holder unit 3. The lead screws 110 and 120 are thus each supported on two sides, which helps reduce the extent of vibration when they rotate.

In addition, position detectors 150 that detect the positions of the movable lens units, i.e., the second lens unit 40 and the third lens unit 50, are disposed at the lens barrel 1, as shown in FIG. 5.

While not shown in FIGS. 1 through 4, a pair of position detectors 150 may be provided in conjunction with each of the lens units 40 and 50. The position detectors 150 provided in conjunction with each lens unit are disposed near the two ends of the range of movement of the detection target lens unit.

The position detectors 150 each include a photointerrupter disposed at the inner wall surface of the barrel body 2 facing opposite the corresponding lens holder 41 or 51 to detect the passage of a projection 151 projecting out of the external circumferential edge of the lens holder 41 (51). The photointerrupter includes an LED and an SPD disposed so as to face opposite each other over a distance large enough for the projection 151 to pass through and detects the passage of the projection 151 based upon whether or not the light emitted from the LED is blocked by the projection 151.

The control unit (not shown) in the lens barrel 1 drives the second lens unit 40 and the third lens unit 50 over their respective ranges of movement by driving the motors 130 and 140. In addition, the control unit determines the positions of the individual lens units 40 and 50 in correspondence to the timing with which the projections 151 at the lens units 40 and 50 pass through the corresponding position detectors 150.

Next, the method adopted when assembling the lens barrel 1 achieved in the embodiment is explained.

In the embodiment, a module assembled in advance by mounting the lead screws 110 and 120 and the motors 130 and 140 at the motor holder unit 3 is then mounted at the barrel body 2.

Figures 8A, 8B:
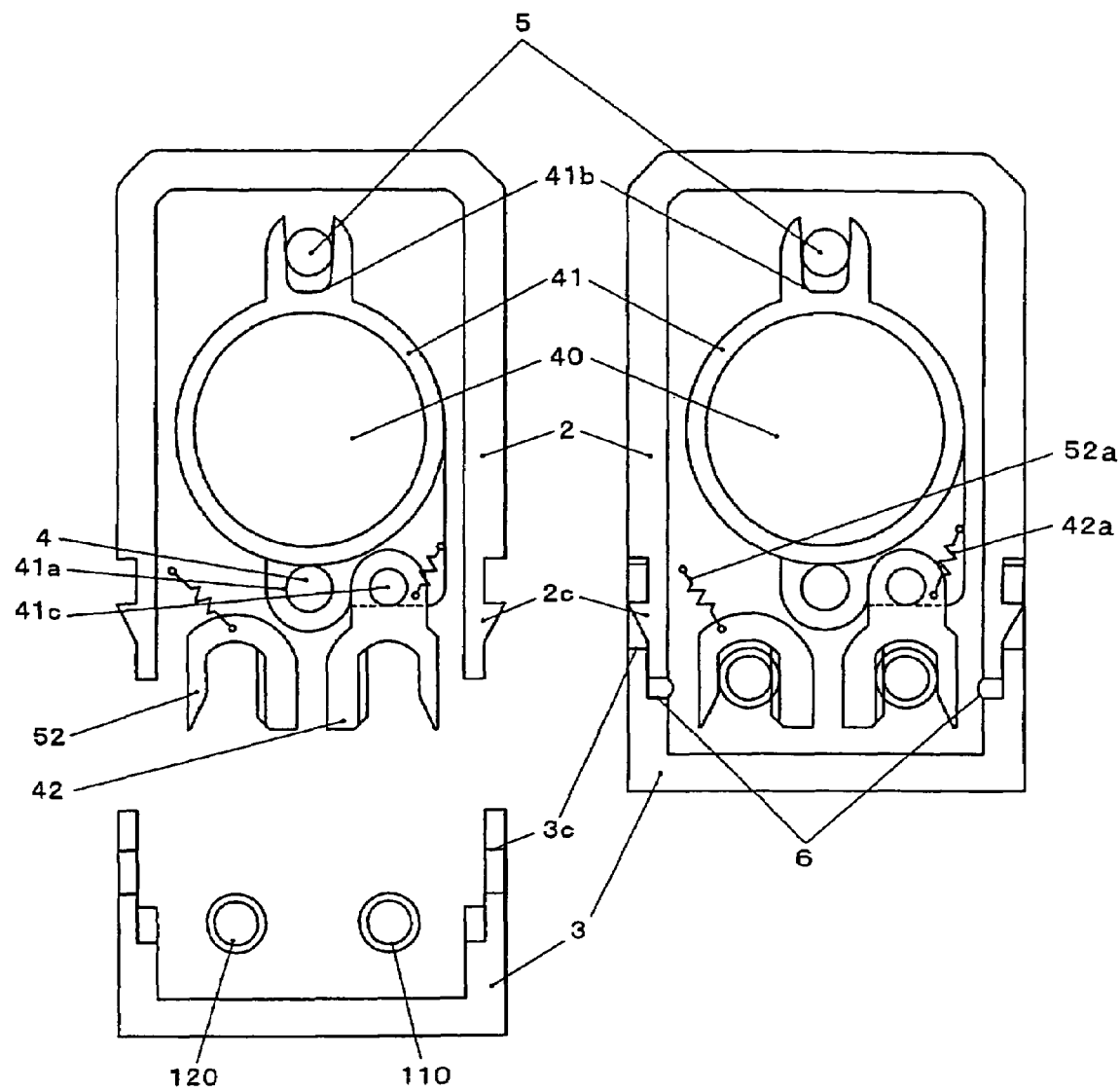
FIGS. 8A and 8B schematically illustrate the method adopted when assembling the lens barrel in FIG. 1.

FIGS. 8A and 8B schematically illustrate the method adopted when mounting the motor holder unit 3 at the barrel body 2, with FIG. 8A showing the state before the motor holder unit 3 is mounted and FIG. 8B showing the state after the motor holder unit 3 is mounted. It is to be noted that in order to simplify the illustration, the structures of the individual members are not shown in detail in FIGS. 8A and 8B.

As shown in FIG. 8A, the motor holder unit 3 is mounted at the barrel body 2 along a direction running perpendicular to the optical axes I1 and I2 (along the up/down direction in FIG. 8A). The lens holder nuts 42 and 52 each include a groove portion extending along the mounting direction with the end thereof located toward the motor holder unit 3, which is formed as an open end, and the female threaded portion formed at one side surface inside the groove portion. Thus, as the motor holder unit 3 is mounted at the barrel body 2, the lead screws 110 and 120 are inserted at the groove portions of the corresponding lens holder nuts 42 and 52, as explained earlier.

The motor holder unit 3 is then locked onto the barrel body 2 by fitting elastic tabs 2c, formed at the end of the barrel body 2 on the side toward the motor holder unit 3, into openings 3c formed at the corresponding positions at the motor holder unit 3 and holding the inserted tabs 2c inside the openings 3c.

It is to be noted that elastic members 6 constituted of a material with elasticity such as rubber are disposed in the space over which the barrel body 2 and the motor holder unit 3 to be joined with each other face opposite each other. As tension is applied to the tabs 2c by repulsion of the elastic members 6, the positional relationship between the barrel body 2 and the motor holder unit 3 is stabilized, which makes it possible to maintain a substantially constant positional relationship between the lead screws 110 and 120 and the lens holder nuts 42 and 52.

Next, an explanation is given on the operational effects achieved in the embodiment of the present invention by comparing the embodiment with a comparison example provided for reference. It is to be noted that structural features of the comparison example similar to those of the embodiment are not explained and the following explanation focuses on the differences between the embodiment and the comparison example.

Figure 9:
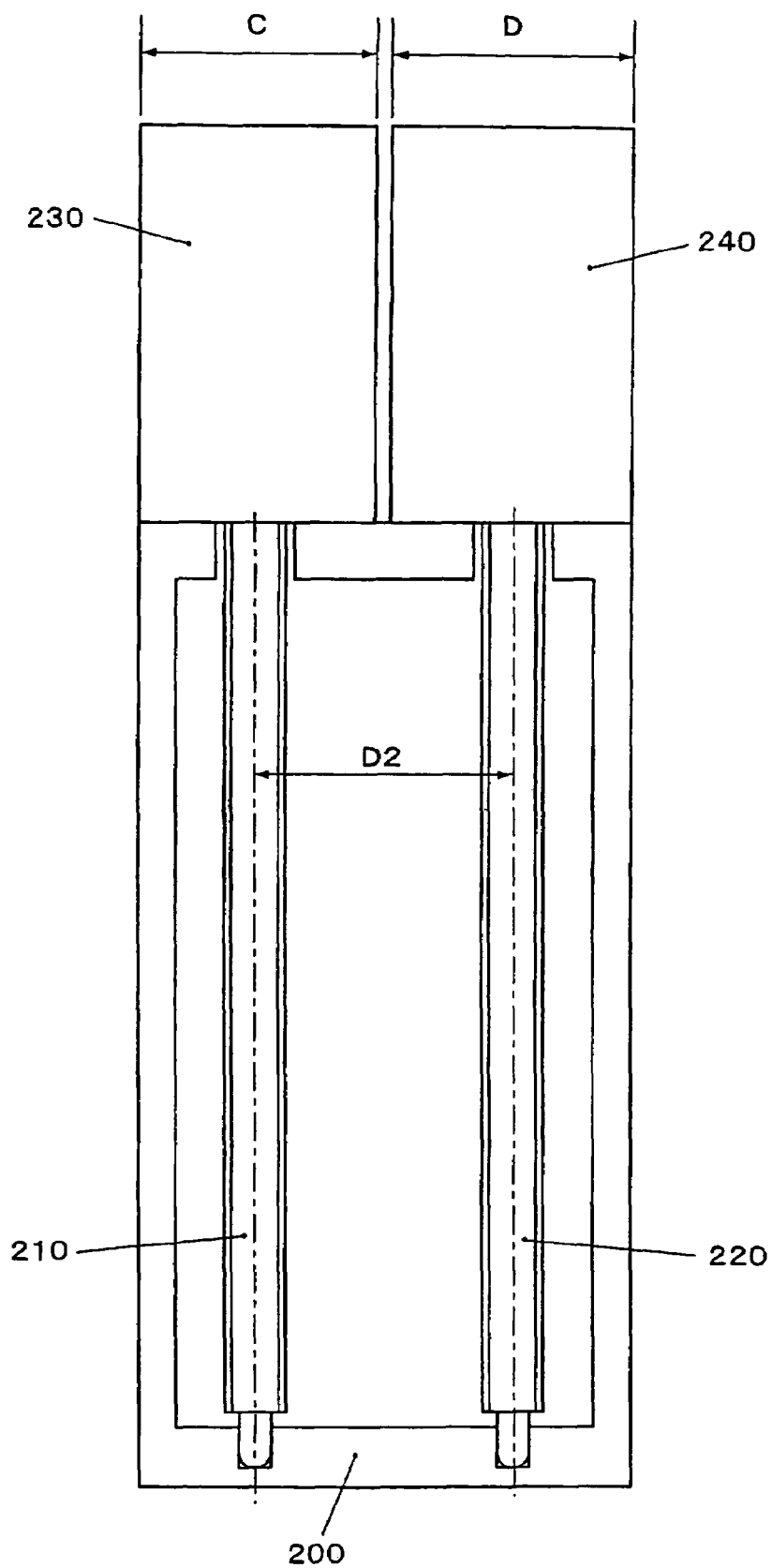
FIG. 9 schematically illustrates the positions at which lead screws and motors are disposed in a lens barrel representing a comparison example to be compared with the present invention.

FIG. 9 shows the positions at which the lead screws and the motors are disposed in a lens barrel in the comparison example.

A motor holder unit 200 in the comparison example includes lead screws 210 and 220 and the motors 230 and 240. As the lead screws 110 and 120 in the embodiment, the lead screws 210 and 220 are disposed parallel to the optical axis I2 to drive the lens holder nuts 42 and 52 respectively. The optical axis I2 is assumed to run along a vertical direction in FIG. 9. The motors 230 and 240 are disposed so as to lie side-by-side at the ends of the lead screws 210 and 220 on the side toward the subject along the optical axis I2, i.e., so as not to overlap when viewed from the direction of the optical axis I2.

The structure adopted in this comparison example does not allow the distance D2 between the axes of the lead screws 210 and 220 to be any less than (C+D)/2 with C and D respectively representing the housing diameters at the motors 230 and 240. This means that the thickness of the lens barrel along the optical axis of the objective lens is bound to be large, assuming that the lens barrel in the comparison example includes a bending optical system similar to that of the embodiment.

Figure 10:
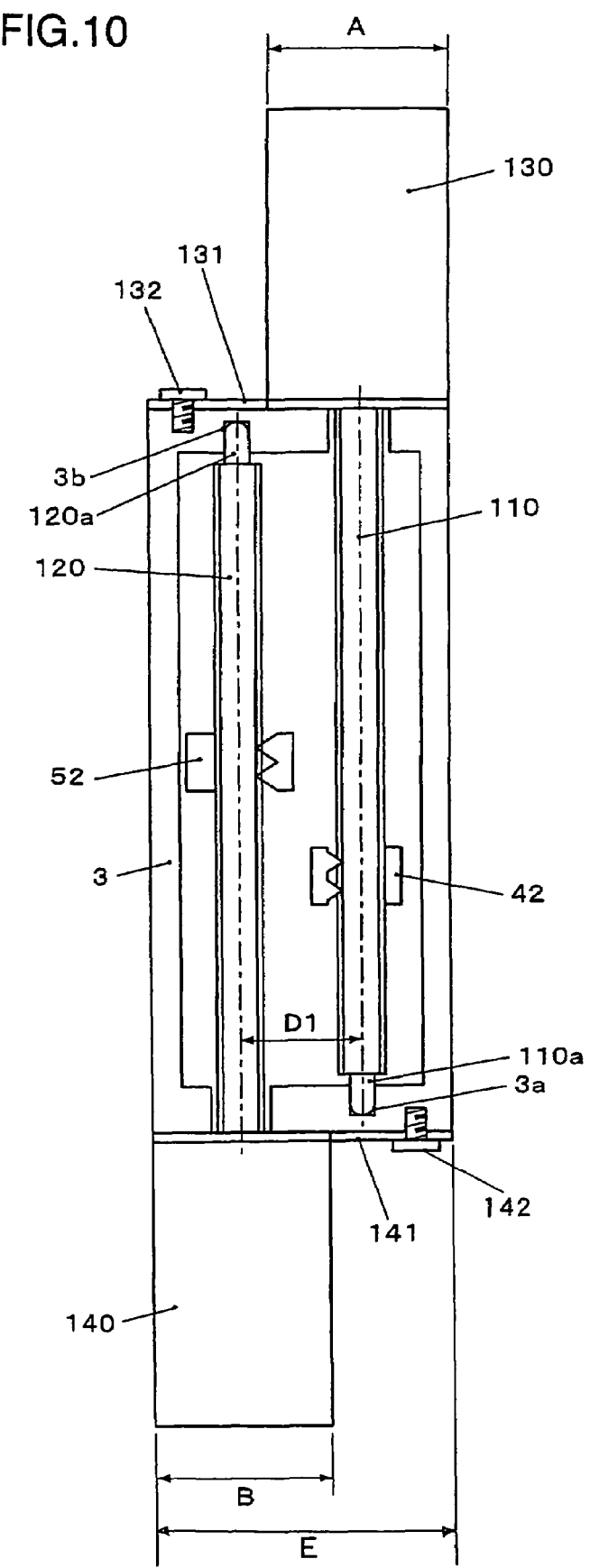
FIG. 10 schematically illustrates the positions at which lead screws and motors are disposed in the lens barrel shown in FIG. 1.

FIG. 10 shows the positional arrangement adopted with regard to the lead screws 110 and 120 and the motors 130 and 140 in the lens barrel 1 in the embodiment.

In the embodiment, the motors 130 and 140 are disposed at the ends of the lead screws 110 and 120 on the sides opposite from each other, and thus, the distance D1 between the axes of the lead screws 110 and 120 can be set smaller than (A+B)/2 with A and B respectively representing the housing diameters at the motors 130 and 140. As a result, the thickness of the lens barrel 1 along the optical axis I1 of the objective lens 10 can be reduced.

The following operational effects can be achieved in the embodiment structured as described above.

(1) As the motors 130 and 140 are disposed over areas overlapping each other when viewed from the direction of the optical axis I2 so that a distance E along the optical axis I1 between the outer ends of the motors 130 and 140 is set smaller than (A+B) as shown in FIG. 10, the lens barrel 1 can be provided as a more compact unit.

(2) The lead screws 110 and 120 and the motors 130 and 140, supported at the motor holder unit 3, can be provided as a module. The module can then be detachably mounted at the barrel body 2. As a result, the assembly process through which the lens barrel 1 is assembled is simplified. More specifically, the two lead screws 110 and 120 and the two motors 130 and 140 can be mounted at the barrel body 2 through a single mounting operation.

(3) Since the motors 130 and 140 are mounted on the sides of the lead screws 110 and 120 opposite from each other, i.e., at the end toward the subject side and the end toward the image side, the distance D1 between the axes of the lead screws 110 and 120 can be reduced by an extent matching the extent to which the areas where the motors 130 and 140 are disposed partially overlap each other when viewed from the direction of the optical axis I2. As a result, the dimension of the lens barrel 1 taken along the direction in which the lead screws 110 and 120 are disposed can be reduced.

(4) The guide shaft 4 used to guide the second lens unit 40 and the third lens unit 50 is disposed adjacent to the lead screws 110 and 120. This means that the second lens unit 40 and the third lens unit 50 are not caused to rotate around the connecting portions where they connect with the guide shaft 4 by the drive force and thus, they do not become tilted. Consequently, the friction is reduced and, at the same time, the level of drive accuracy is improved.

(5) Since the common guide shaft 4 guides the second lens unit 40 and the third lens unit 50, they do not become decentered relative to each other and the ranges of movement of the individual lens units are allowed to partially overlap each other.

(6) Since the ND filter drive portion 62 is disposed on the side opposite from the motor 140 with the optical axis I2 present between them, the ND filter drive portion 62 can be set further toward the subject side along the optical axis I2, which makes it possible to reduce the external dimensions of the lens barrel 1.

(7) Since the external edges of the objective lens 10 and the first lens unit 30, which would be set adjacent to each other, are cut off, the objective lens 10 and the first lens unit 30 can be disposed close to each other while preventing interference. As a result, the external dimensions of the lens barrel 1 can be reduced. In addition, the structure assumed at each lens unit 10 or 30, i.e., only one side of each lens is cut off, can be achieved by a machining a round lens through a small number of machining steps.

(Examples of Variations)

The present invention is not limited to the embodiment described above and allows for numerous variations and modifications which will be equally included in the scope of the present invention.

(1) While the lens barrel in the embodiment described above includes a bending optical system, the present invention may also be adopted in conjunction with an optical system that does not include a bending portion.

In addition, the lens barrel may be adopted in another type of apparatus, as well as in a digital still camera, as in the embodiment.

(2) While the structure in the embodiment includes two drive shafts, the present invention may be adopted in a structure having three or more drive shafts, to provide a lens barrel as a more compact unit by disposing the drive units connected to at least two drive shafts on different sides.

(3) The assembly process can be simplified by using an integrated module that is prepared in advance by mounting the drive shafts and the drive units at a support member in conjunction with the plurality of drive units disposed parallel to each other on one side, as well as in conjunction with the drive units disposed on different sides of the corresponding drive shafts, as in the embodiment.

As shown in FIG. 11, the imaging apparatus 310 may be provided as a compact unit by connecting the lens barrel 1 explained above to the image processing device 300. As an imaging apparatus 310, a digital camera or film camera may be used. The image processing device 310 may also include a liquid crystal monitor 320.

The above described embodiments are examples and various modifications can be made without departing from the scope of the invention.

What is claimed is:

1. A lens barrel comprising:
a first optical element that is allowed to move along an optical axis;
a first driven member connected to the first optical element;
a second optical element disposed in the optical axis of the first optical element, which is allowed to move along the optical axis;
a second driven member connected to the second optical element;
a first drive shaft disposed substantially parallel to the optical axis to drive the first driven member along the optical axis;
a second drive shaft disposed substantially parallel to the optical axis to drive the second driven member along the optical axis;
a first drive unit connected to an end of the first drive shaft to drive the first drive shaft;
a second drive unit connected to an end of the second drive shaft to drive the second drive shaft and disposed at a position that partially overlaps a position of the first drive unit when viewed from the direction of the optical axis;
a light quantity adjustment unit disposed toward an image side along the optical axis relative to the first and second optical elements to reduce a quantity of light; and
a light quantity adjustment drive unit disposed on a side opposite from the second drive unit with the optical axis present in between, to drive the light quantity adjustment unit.

2. A lens barrel according to claim 1, further comprising:
a barrel body in which the first optical element and the second optical element are housed; and
a support member detachably mounted at the barrel body, which supports the first drive shaft, the second drive shaft, the first drive unit and the second drive unit.

3. A lens barrel according to claim 2, further comprising:
a guide unit that guides movement of the first optical element and the second optical element along the optical axis and is disposed on a side where the first drive shaft and the second drive shaft are disposed relative to the optical axis.

4. A lens barrel according to claim 3, wherein:
a first range over which the guide unit guides the first optical element and a second range over which the guide unit guides the second optical element partially overlap along the optical axis.

5. A lens barrel according to claim 1, wherein:
the first drive unit is connected to an end of the first drive shaft toward a subject side along the optical axis; and
the second drive unit is connected to an end of the second drive shaft toward an image side along the optical axis.

6. A lens barrel according to claim 5, further comprising:
a barrel body in which the first optical element and the second optical element are housed; and
a support member detachably mounted at the barrel body, which supports the first drive shaft, the second drive shaft, the first drive unit and the second drive unit.

7. A lens barrel according to claim 5, further comprising:
a guide unit that guides movement of the first optical element and the second optical element along the optical axis and is disposed on a side where the first drive shaft and the second drive shaft are disposed relative to the optical axis.

8. A lens barrel according to claim 7, wherein:
a first range over which the guide unit guides the first optical element and a second range over which the guide unit guides the second optical element partially overlap along the optical axis.

9. A lens barrel comprising:
a first optical element that is allowed to move along an optical axis;
a first driven member connected to the first optical element;
a second optical element disposed in the optical axis of the first optical element, which is allowed to move along the optical axis;
a second driven member connected to the second optical element;
a first drive shaft disposed substantially parallel to the optical axis to drive the first driven member along the optical axis;
a second drive shaft disposed substantially parallel to the optical axis to drive the second driven member along the optical axis;
a first drive unit connected to an end of the first drive shaft to drive the first drive shaft;
a second drive unit connected to an end of the second drive shaft to drive the second drive shaft;
a barrel body in which the first optical element and the second optical element are housed;
a support member detachably mounted at the barrel body, which supports the first drive shaft, the second drive shaft, the first drive unit and the second drive unit;
a light quantity adjustment unit disposed toward an image side along the optical axis relative to the first and second optical elements to reduce a quantity of light; and
a light quantity adjustment drive unit disposed on a side opposite from the second drive unit with the optical axis present in between, to drive the light quantity adjustment unit.

10. An imaging apparatus, comprising:
a first optical element that is allowed to move along an optical axis;
a first driven member connected to the first optical element;
a second optical element disposed in the optical axis of the first optical element, which is allowed to move along the optical axis;
a second driven member connected to the second optical element;
a first drive shaft disposed substantially parallel to the optical axis to drive the first driven member along the optical axis;
a second drive shaft disposed substantially parallel to the optical axis to drive the second driven member along the optical axis;
a first drive unit connected to an end of the first drive shaft to drive the first drive shaft;
a second drive unit connected to an end of the second drive shaft to drive the second drive shaft and disposed at a position that partially overlaps a position of the first drive unit when viewed from the direction of the optical axis;
an image-capturing element that captures a subject image via the first optical element and the second optical element;
a light quantity adjustment unit disposed toward an image side along the optical axis relative to the first and second optical elements to reduce a quantity of light; and a light quantity adjustment drive unit disposed on a side opposite from the second drive unit with the optical axis present in between, to drive the light quantity adjustment unit.

11. An imaging apparatus according to claim 10, wherein:
the first drive unit is connected to an end of the first drive shaft toward a subject to be imaged along the optical axis; and
the second drive unit is connected to an end of the second drive shaft toward the image-capturing element along the optical axis.

12. An imaging apparatus according to claim 11, further comprising:
an objective lens disposed at a position closest to the subject along the optical axis; and
a deflecting member disposed between the objective lens and the first optical element to deflect light from the subject.

13. An imaging apparatus according to claim 12, wherein:
the deflecting member is a prism.

* * * * *